UNITED STATES PATENT OFFICE.

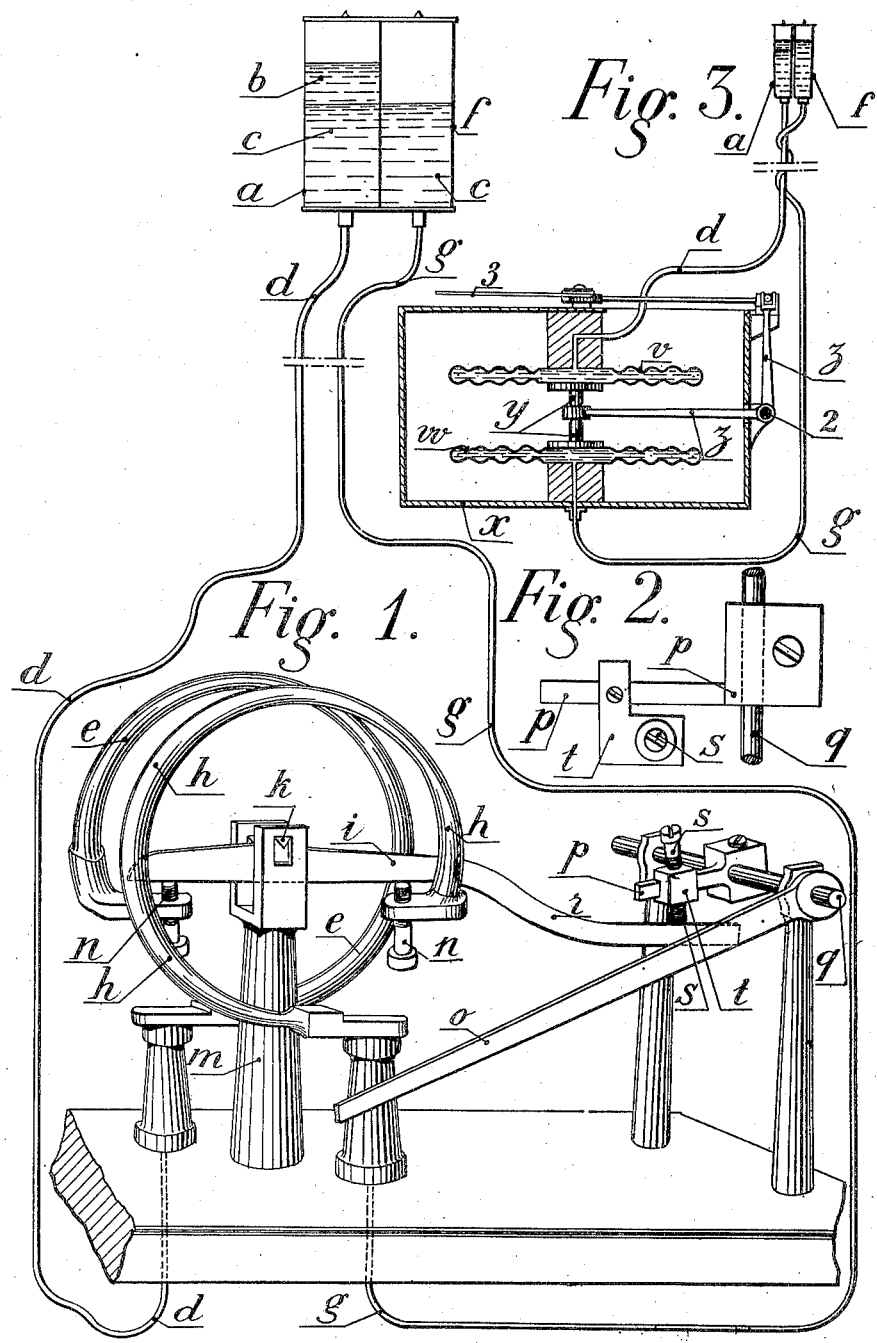

JOSEPH BARBE FOURNIER, OF PARIS, FRANCE.

THERMOMETER UTILIZING TENSION OF SATURATED VAPORS.

997,188.   Specification of Letters Patent.   Patented July 4, 1911.

Application filed May 3, 1909. Serial No. 493,662.

*To all whom it may concern:*

Be it known that I, JOSEPH BARBE FOURNIER, a citizen of the French Republic, and resident of Paris, France, have invented certain new and useful Improvements in Thermometers Utilizing the Tension of Saturated Vapors, of which the following is a specification.

This invention relates to thermometers utilizing the tension of saturated vapors which, as is generally known, are characterized by the fact, that the indicating of the temperature is effected not by means of the expansion of a substance but by means of the tension which is produced in any given vapor by the contact with its generating liquid. This tension is a mathematical function of the temperature, which therefore can be measured by the said tension with this considerable advantage, that, owing to the facility with which the pressure can be transmitted over a great distance, the indications of the apparatus can be registered at any point which may be very distant of the point at which the temperature is measured. An apparatus of this type is generally essentially composed of a hermetically sealed reservoir with which, at a determined point, a tube for transmitting the pressure is connected, whose other end is connected with a manometer. The thermometrical substance is chosen so that it vaporizes within the limits of the temperature to be measured. The tension of the vapor of said substance is transmitted to the manometer by means of a suitable liquid filling the greater part of the explorer reservoir, the transmitting tube and the manometer. With any apparatus which has only one explorer reservoir the indications depend on the difference of level which exists between the explorer reservoir and the manometer and at the same time on the variations of the atmospherical pressure, for that reason that the function of the instrument is based upon variations of pressure.

The present invention has for its object to obviate this inconvenience by automatically compensating all perturbating influences.

The improvements which form the object of the present invention are characterized:—

(a) By the adjunction to the explorer reservoir of a compensating reservoir of identical construction which however does not contain any sensitive substance; this reservoir only contains the motor liquid which has to be chosen so that the tension of its vapor is as feeble as possible with regard to the tension of the sensitive substance. (b) By the disposition of two manometrical tubes acting in opposite directions upon the indicating or registering device, one of said tubes communicating with the explorer reservoir and the other with the compensating reservoir. It will be easily seen that if both reservoirs are arranged in identical conditions with regard to the manometers and if both manometers are simultaneously submitted to the variations of the atmospherical pressure, the hand of the indicating or registering apparatus will only indicate the variations of pressure resulting from the tension of the vapor of the sensitive substance; the indications of the apparatus are thus automatically corrected of the perturbating influence mentioned above.

In the accompanying drawings two constructional forms of the improved thermometer are shown by way of example.

Figure 1 shows in elevation the first form of execution of the apparatus. Fig. 2 represents a constructional detail. Fig. 3 shows a modified form of the apparatus.

The apparatus according to this invention comprises two explorer reservoirs which are juxtaposed; the one, $a$, is the sensitive reservoir and contains the volatile liquid $b$ and the motor liquid $c$; it is connected by means of a tube $d$ with a manometrical tube $e$. The other, or compensating reservoir $f$ only contains the motor liquid $c$ and it is connected by means of tube $g$ with a second motor or manometrical tube $h$ which is arranged at the side of the other tube but in opposite direction. The free ends of the tubes $e$ and $h$ act upon the ends of a beam $i$ adapted to oscillate around a knife-edge $k$ fixed in a suitable support $m$. Regulating screws $n$ upon the ends of said motor tubes serve to regulate the action of said tubes upon the beam. It is obvious that the oscillations of the beam correspond with the difference of the pressure exerted by the motor tubes $e$ and $h$ and consequently with the temperature to be measured, as the only difference which exists between the actions of the two motor tubes results from the sensitive substance $b$. To register the oscillations of the beam $i$ said beam is connected with a suitable device comprising a registering hand or arm $o$. The transmitting device could for example consist of a crank arm $p$ keyed upon the shaft $q$ which it revolves and upon one of whose ends the indicating member $o$ is fixed. This crank arm is connected with the end $r$ of beam $i$ by means of a screw bolt $s$ mounted in a link $t$ and bearing with its free end upon said beam. The regulation is effected by the adjustment of said link and of its screw bolt.

Fig. 3 shows a modified form of the apparatus which is particularly destined for physicians who actually cannot measure exactly the temperature of a patient as they have to remove the thermometer for reading its indications, whereby only approximate temperatures are indicated, which is not sufficient. The apparatus shown in Fig. 3 permits to survey at any distance of the patient all the indications of the apparatus, as will be explained. This apparatus comprises like the apparatus shown in and described with reference to Fig. 1, two juxtaposed reservoirs $a$ and $f$ which are connected by flexible tubes $d$ and $g$ respectively with the motor devices; for the motor tubes, used in the apparatus shown in Fig. 1, simple reservoirs of an aneroid barometer are used, which reservoirs $v$ and $w$ are of generally known construction. Said reservoirs $v$ and $w$ are placed the one above the other and filled, as well as the tubes $d$ and $g$ with the motor liquid $c$. The upper surface of reservoir $v$ and the lower surface of reservoir $w$ are fixed upon the metal frame $x$, the other surfaces of said reservoirs being arranged so that they can freely oscillate the one with regard to the other and they are connected with each other by means of a rod $y$ which acts in the same manner as the beam $k$ (Fig. 1). This rod acts upon a knee lever $z$ adapted to pivot around the horizontal axle 2 and which communicates its motion by any suitable connecting means to the hand 3 which thus is moved over the graduated scale. The indications of this hand are absolutely independent of the relative position of the reservoirs $a$ and $f$ with regard to the reservoirs $v$ and $w$ and also of the variations of the atmospherical pressure. The two tubes $d$ and $g$ may be india-rubber tubes wound the one around the other. For avoiding the noxious effects of the pressure of the air which is contained in the upper part of the compensating reservoir $f$ above the liquid $c$ it is advisable to produce the vacuum in this part.

The hereinbefore described devices have been cited by way of example only they could be modified in the most various manner without departing from the idea of the present invention; besides, it is obvious that the said arrangements are not only applicable to thermometers or thermo-regulators utilizing the tension of saturated vapors but also to any other apparatus destined to produce a determined effect which is the function of the temperature or of the pressure of a saturated vapor.

I claim:—

An improved thermometer utilizing the tension of saturated vapors comprising in combination the sensitive reservoir and the compensating reservoir, two barometrical reservoirs, two flexible tubes connecting said first mentioned reservoirs each with one of the barometrical reservoirs and the device for operating the indicating member arranged between said barometrical reservoirs.

In witness whereof I have hereunto set my hand in the presence of two witnesses.

JOSEPH BARBE FOURNIER.

Witnesses:
 DEAN M. MASON,
 ALFRED FREY.